US012561972B2

(12) United States Patent
Liu et al.

(10) Patent No.: US 12,561,972 B2
(45) Date of Patent: Feb. 24, 2026

(54) IoT INTEGRATED REAL TIME MANAGEMENT OF EMISSIONS USING SATELLITE DATA

(71) Applicant: International Business Machines Corporation, Armonk, NY (US)

(72) Inventors: Su Liu, Austin, TX (US); Martin G. Keen, Cary, NC (US); Jeremy R. Fox, Georgetown, TX (US); Hamid Majdabadi, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 18/311,061

(22) Filed: May 2, 2023

(65) Prior Publication Data

US 2024/0371153 A1     Nov. 7, 2024

(51) Int. Cl.
| *G06V 20/13* | (2022.01) |
| *G16Y 20/10* | (2020.01) |
| *G16Y 40/10* | (2020.01) |
| *G16Y 40/20* | (2020.01) |

(52) U.S. Cl.
CPC .............. *G06V 20/13* (2022.01); *G16Y 20/10* (2020.01); *G16Y 40/10* (2020.01); *G16Y 40/20* (2020.01)

(58) Field of Classification Search
CPC ........ G06V 20/13; G16Y 20/10; G16Y 40/10; G16Y 40/20
See application file for complete search history.

(56) References Cited

U.S. PATENT DOCUMENTS

| 10,697,947 B1 | 6/2020 | Armitage |
| 11,215,593 B2 | 1/2022 | Armitage |
| 11,366,057 B2 | 6/2022 | Scott et al. |
| 2020/0093088 A1 | 3/2020 | Carta |
| 2023/0126832 A1* | 4/2023 | White .................... G06Q 10/06 |
| | | 705/7.13 |

(Continued)

OTHER PUBLICATIONS

"Global Methane Tracker 2022," International Energy Agency, Feb. 23, 2022, 31 pages.https://iea.blob.core.windows.net/assets/48ea967f-ff56-40c6-a85d-29294357d1f1/GlobalMethaneTracker_Documentation.pdf.

(Continued)

*Primary Examiner* — Juan M Guillermety
(74) *Attorney, Agent, or Firm* — Yee & Associates, P.C.

(57) ABSTRACT

A computer implemented method monitors a selected type of emission. A number of processor units identifies a set of areas on a planet with a potentially undesired emission level for the selected type of emission using satellite data and a machine learning model trained to identify the potentially undesired emission level for the selected type of emission. The number of processor units selects a number of Internet of Things sensors to monitor for the selected type of emission in the set of areas in real time. The number of processor units analyzes emissions data generated by the number of Internet of Things sensors from monitoring for the selected type of emission to form an analysis. The number of processor units performs a set of actions using the analysis. According to other embodiments, a computer system and a computer program product for monitoring for a selected type of emission are provided.

20 Claims, 11 Drawing Sheets

(56) References Cited

U.S. PATENT DOCUMENTS

| 2023/0177330 | A1* | 6/2023 | Readick | G06N 3/08 |
| | | | | 706/25 |
| 2023/0304981 | A1* | 9/2023 | Eichenlaub | G01N 33/0031 |
| 2023/0351732 | A1* | 11/2023 | Story | G06V 20/13 |

OTHER PUBLICATIONS

Anonymous, "System to Estimate the GHG Emission from Power Plants Using an Ensemble of Methods and Data Sources," An IP.com Prior Art Database Technical Disclosure, IPCOM000266137D, Jun. 16, 2021, 6 pages.

Anonymous, "Three-Dimensional Map Routing to Minimize Pathogen Exposure During a Pandemic Based on Augmented Reality, Machine Learning, and Internet of Things," An IP.com Prior Art Database Technical Disclosure, IPCOM000265171D, Mar. 8, 2021, 6 pages.

Bandara et al., "AIRSPEC: An IOT-Empowered Air Quality Monitoring System Integrated With A Machine Learning Framework To Detect And Predict Defined Air Quality Parameters," Department of Electronic and Telecommunication Engineering, University of Moratuwa, Sri Lanka, Nov. 28, 2021, 6 pages.https://arxiv.org/pdf/2111.14125.pdf.

Hammerling et al., "Improving Satellite Monitoring of Methane Emissions," The Payne Institute for Public Policy, Colorado School of Mines, Nov. 9, 2021, 6 pages. https://payneinstitute.mines.edu/wp-content/uploads/sites/149/2021/11/Payne-Institute-Commentary-Improving-satellite-monitoring-of-methane-emissions.pdf.

Wang et al., "Machine Vision for Natural Gas Methane Emissions Detection Using an Infrared Camera," Applied Energy, vol. 257, Jan. 1, 2020, 28 pages.https://arxiv.org/pdf/1904.08500.pdf.

Covert et al., "Machine Learning and Satellite Imaging to Reduce Methane Emissions", https://web.archive.org/web/20250319064418/https://datascience.uchicago.edu/research/machine-learning-and-satellite-imaging-to-reduce-methane-emissions/, Mar. 19, 2025, 4 pages.

Irakulis-Loitxate et al., "Satellites Detect a Methane Ultra-emission Event from an Offshore Platform in the Gulf of Mexico", Environmental Science & Technology Letters, Jun. 1, 2022, 6 pages.

Jim Morrison, "A New Generation of Satellites Is Helping Authorities Track Methane Emissions", https://www.smithsonianmag.com/science-nature/a-new-generation-of-satellites-is-helping-authorities-track-methane-emissions-180979181/, Jan. 19, 2022, 11 pages.

Markus Cozowicz, "Using AI for Methane Emissions Detection", https://www.linkedin.com/pulse/using-ai-methane-emissions-detection-markus-cozowicz, Apr. 19, 2021, 14 pages.

No Author, "IBM Environmental Intelligence Suite", https://www.ibm.com/docs/en/environmental-intel-suite?topic=product-overview, Feb. 28, 2025, 2 pages.

No Author, "Importance of Methane", https://www.epa.gov/gmi/importance-methane, Mar. 3, 2025, 3 pages.

No Author, "Mapping methane emissions on a global scale", https://www.esa.int/Applications/Observing_the_Earth/Copernicus/Sentinel-5P/Mapping_methane_emissions_on_a_global_scale, Apr. 5, 2020, 5 pages.

No Author, "MethaneSAT", https://web.archive.org/web/20250717095515/https://www.methanesat.org/, Jul. 17, 2025, 6 pages.

Zhu et al., "METER-ML: A Multi-Sensor Earth Observation Benchmark for Automated Methane Source Mapping", https://ceur-ws.org/Vol-3207/paper6.pdf, Jul. 2022, 11 pages.

* cited by examiner

COMPUTING ENVIRONMENT
100

FIG. 1

COMPUTER    101

PROCESSOR SET    110

120 — PROCESSING CIRCUITRY     CACHE — 121

111 — COMMUNICATION FABRIC

112 — VOLATILE MEMORY

PERSISTENT STORAGE    113

122 — OPERATING SYSTEM     EMISSIONS MONITOR — 190

PERIPHERAL DEVICE SET    114

123 — UI DEVICE SET     124 — STORAGE     IoT SENSOR SET — 125

NETWORK MODULE   115

103

END USER DEVICE

PRIVATE CLOUD

106

WAN
102

REMOTE SERVER

REMOTE DATABASE

130

104

GATEWAY   140

PUBLIC CLOUD   105

141 — CLOUD ORCHESTRATION MODULE     HOST PHYSICAL MACHINE SET — 142

143 — VIRTUAL MACHINE SET     CONTAINER SET — 144

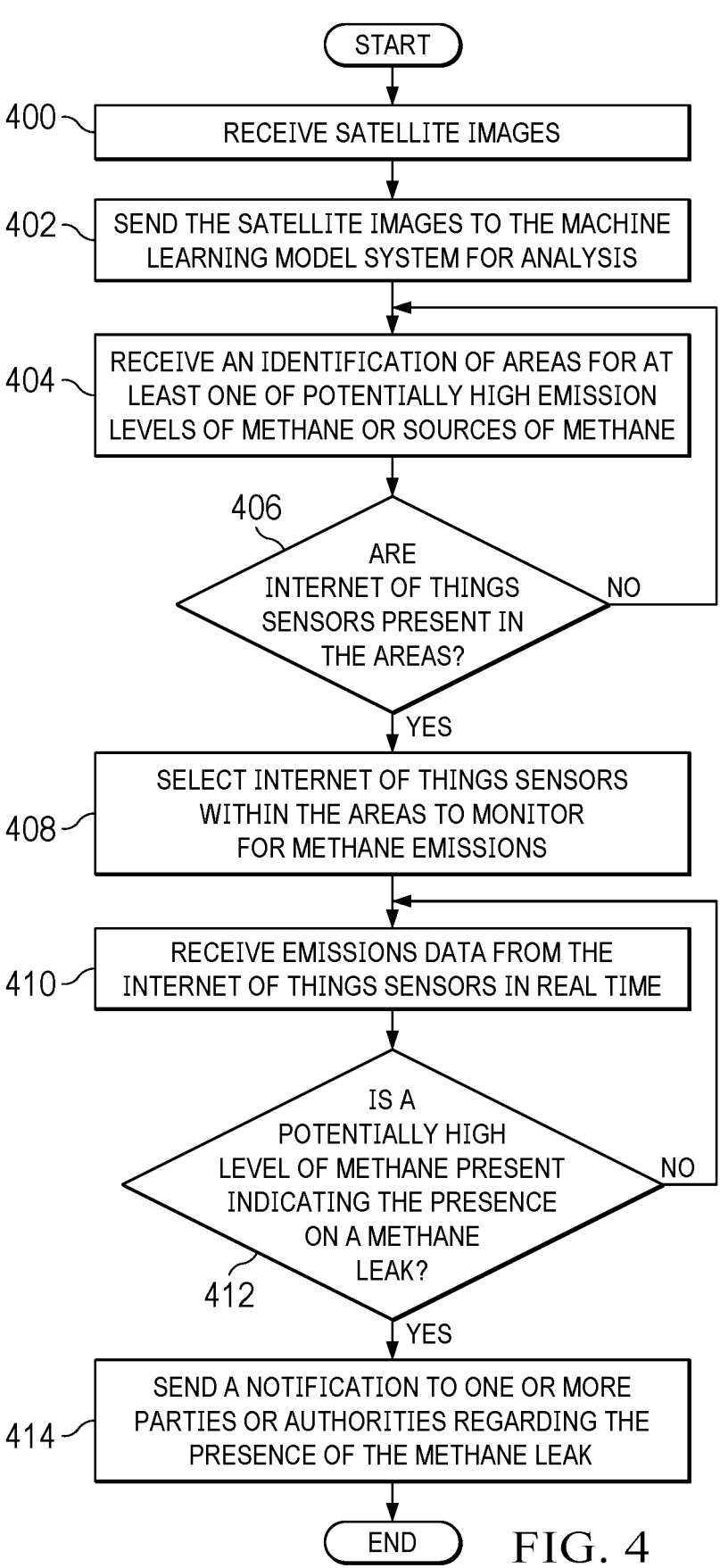

START

400 — RECEIVE SATELLITE IMAGES

402 — SEND THE SATELLITE IMAGES TO THE MACHINE LEARNING MODEL SYSTEM FOR ANALYSIS

404 — RECEIVE AN IDENTIFICATION OF AREAS FOR AT LEAST ONE OF POTENTIALLY HIGH EMISSION LEVELS OF METHANE OR SOURCES OF METHANE

406 — ARE INTERNET OF THINGS SENSORS PRESENT IN THE AREAS?     NO

YES

408 — SELECT INTERNET OF THINGS SENSORS WITHIN THE AREAS TO MONITOR FOR METHANE EMISSIONS

410 — RECEIVE EMISSIONS DATA FROM THE INTERNET OF THINGS SENSORS IN REAL TIME

IS A POTENTIALLY HIGH LEVEL OF METHANE PRESENT INDICATING THE PRESENCE ON A METHANE LEAK?     NO

412

YES

414 — SEND A NOTIFICATION TO ONE OR MORE PARTIES OR AUTHORITIES REGARDING THE PRESENCE OF THE METHANE LEAK

END     FIG. 4

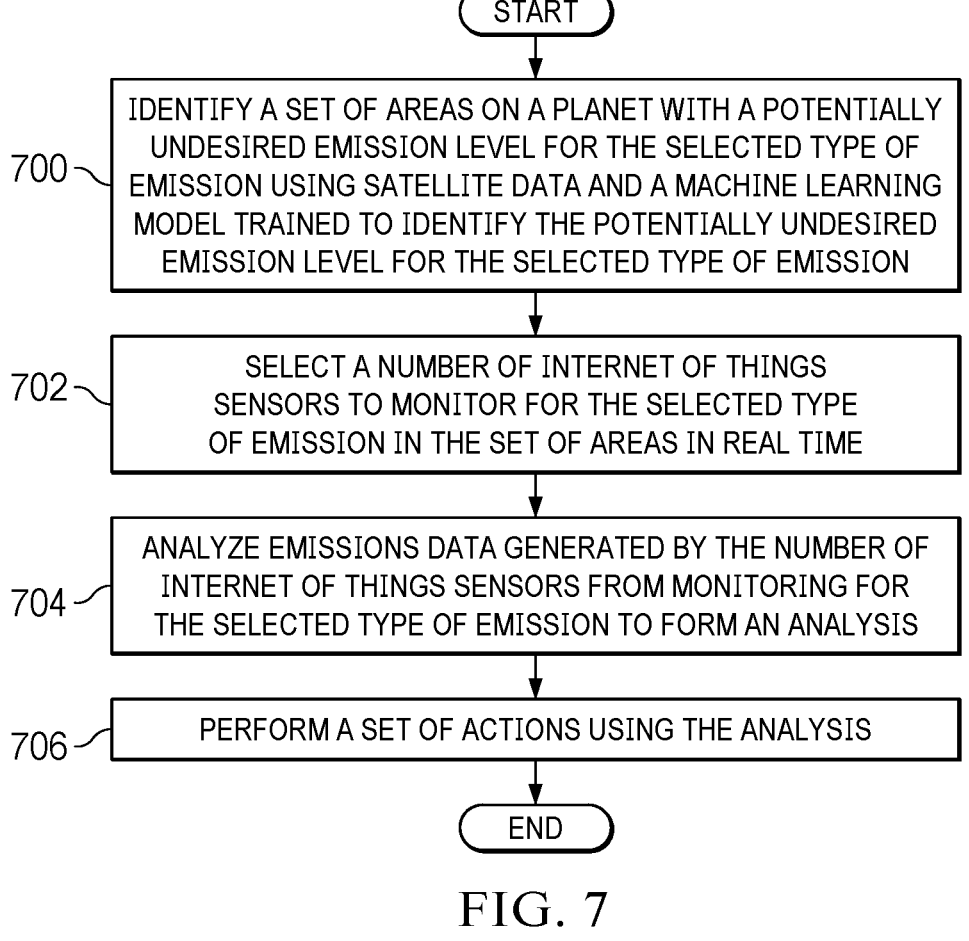

700 — IDENTIFY A SET OF AREAS ON A PLANET WITH A POTENTIALLY UNDESIRED EMISSION LEVEL FOR THE SELECTED TYPE OF EMISSION USING SATELLITE DATA AND A MACHINE LEARNING MODEL TRAINED TO IDENTIFY THE POTENTIALLY UNDESIRED EMISSION LEVEL FOR THE SELECTED TYPE OF EMISSION

702 — SELECT A NUMBER OF INTERNET OF THINGS SENSORS TO MONITOR FOR THE SELECTED TYPE OF EMISSION IN THE SET OF AREAS IN REAL TIME

704 — ANALYZE EMISSIONS DATA GENERATED BY THE NUMBER OF INTERNET OF THINGS SENSORS FROM MONITORING FOR THE SELECTED TYPE OF EMISSION TO FORM AN ANALYSIS

706 — PERFORM A SET OF ACTIONS USING THE ANALYSIS

FIG. 7

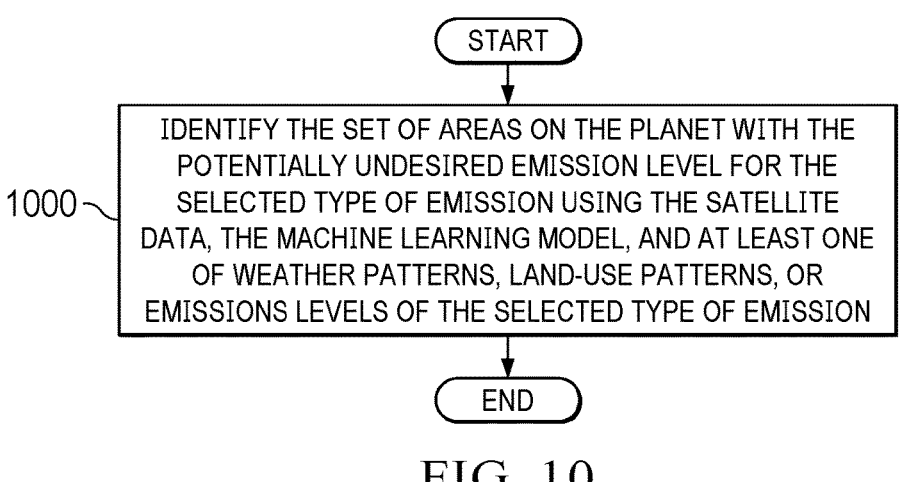

START

1000 — IDENTIFY THE SET OF AREAS ON THE PLANET WITH THE POTENTIALLY UNDESIRED EMISSION LEVEL FOR THE SELECTED TYPE OF EMISSION USING THE SATELLITE DATA, THE MACHINE LEARNING MODEL, AND AT LEAST ONE OF WEATHER PATTERNS, LAND-USE PATTERNS, OR EMISSIONS LEVELS OF THE SELECTED TYPE OF EMISSION

END

FIG. 10

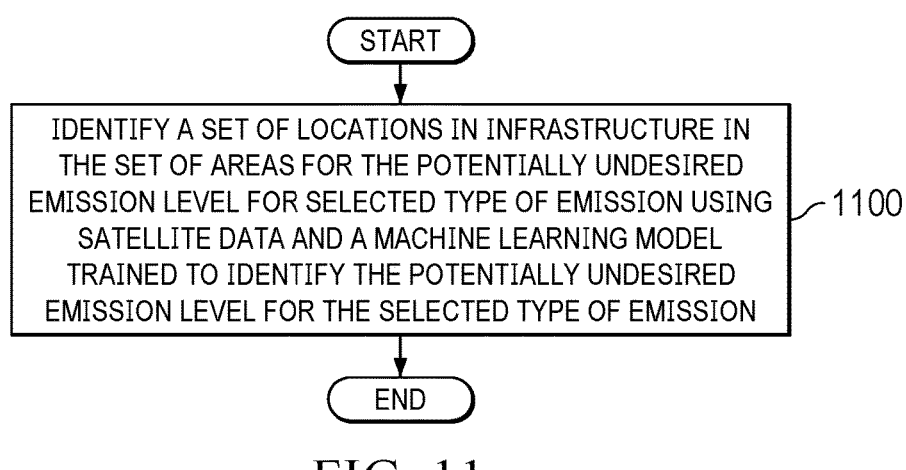

START

IDENTIFY A SET OF LOCATIONS IN INFRASTRUCTURE IN THE SET OF AREAS FOR THE POTENTIALLY UNDESIRED EMISSION LEVEL FOR SELECTED TYPE OF EMISSION USING SATELLITE DATA AND A MACHINE LEARNING MODEL TRAINED TO IDENTIFY THE POTENTIALLY UNDESIRED EMISSION LEVEL FOR THE SELECTED TYPE OF EMISSION — 1100

END

FIG. 11

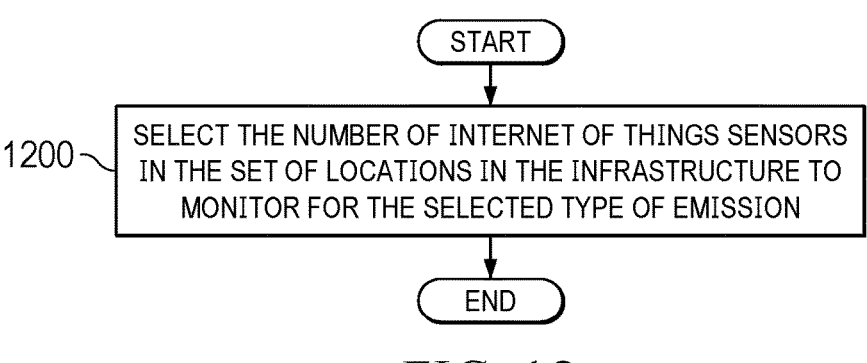

START

1200 — SELECT THE NUMBER OF INTERNET OF THINGS SENSORS IN THE SET OF LOCATIONS IN THE INFRASTRUCTURE TO MONITOR FOR THE SELECTED TYPE OF EMISSION

END

FIG. 12

IoT INTEGRATED REAL TIME MANAGEMENT OF EMISSIONS USING SATELLITE DATA

BACKGROUND

The disclosure relates generally to an improved computer system and more specifically to managing emissions such as greenhouse gases in real time using Internet of Things (IoT) sensors.

Emissions such as greenhouse gases released in the atmosphere can cause harm to the environment. Greenhouse gases such as methane, carbon dioxide and nitrous oxide can trap heat in the atmosphere leading to global warming and climate change. Methane is a potent greenhouse gas with a much greater warming potential than carbon dioxide. For example, methane has global warming potential that is 84 times greater than carbon dioxide over a 20-year period. As a result, reducing methane emissions and preventing methane the is an important objective for organizations around the world.

Monitoring methane emissions can be used to determine the effectiveness of greenhouse gas reduction strategies and evaluate the effectiveness of the strategies. Currently, sensors and monitoring systems are placed in ground locations to monitor for methane as well as other types of greenhouse emissions. The data gathered from this monitoring can be used to track trends in greenhouse gases. This data can be used to determine the effectiveness of current greenhouse gas reduction strategies and can also be used to modify and develop new strategies.

SUMMARY

According to one illustrative embodiment, a computer implemented method monitors a selected type of emission. A number of processor units identifies a set of areas on a planet with a potentially undesired emission level for the selected type of emission using satellite data and a machine learning model trained to identify the potentially undesired emission level for the selected type of emission. The number of processor units selects a number of Internet of Things sensors to monitor for the selected type of emission in the set of areas in real time. The number of processor units analyzes emissions data generated by the number of Internet of Things sensors from monitoring for the selected type of emission to form an analysis. The number of processor units performs a set of actions using the analysis. According to other illustrative embodiments, a computer system and a computer program product for monitoring for a selected type of emission are provided.

BRIEF DESCRIPTION OF THE DRAWINGS

FIG. 1 is a block diagram of a computing environment in accordance with an illustrative embodiment;

FIG. 4 is a flowchart of a process for methane emission control in accordance with an illustrative embodiment;

FIG. 7 is a flowchart of a process for monitoring for a selected type of emission in accordance with an illustrative embodiment;

FIG. 10 is a flowchart of a process for identifying areas for monitoring in accordance with an illustrative embodiment;

FIG. 11 is a flowchart of a process for identifying a set of locations in infrastructure to monitor for emissions in accordance with an illustrative embodiment;

FIG. 12 is a flowchart of a process for selecting Internet of Things sensors to monitor for emissions in accordance with an illustrative embodiment;

DETAILED DESCRIPTION

Figure 2:
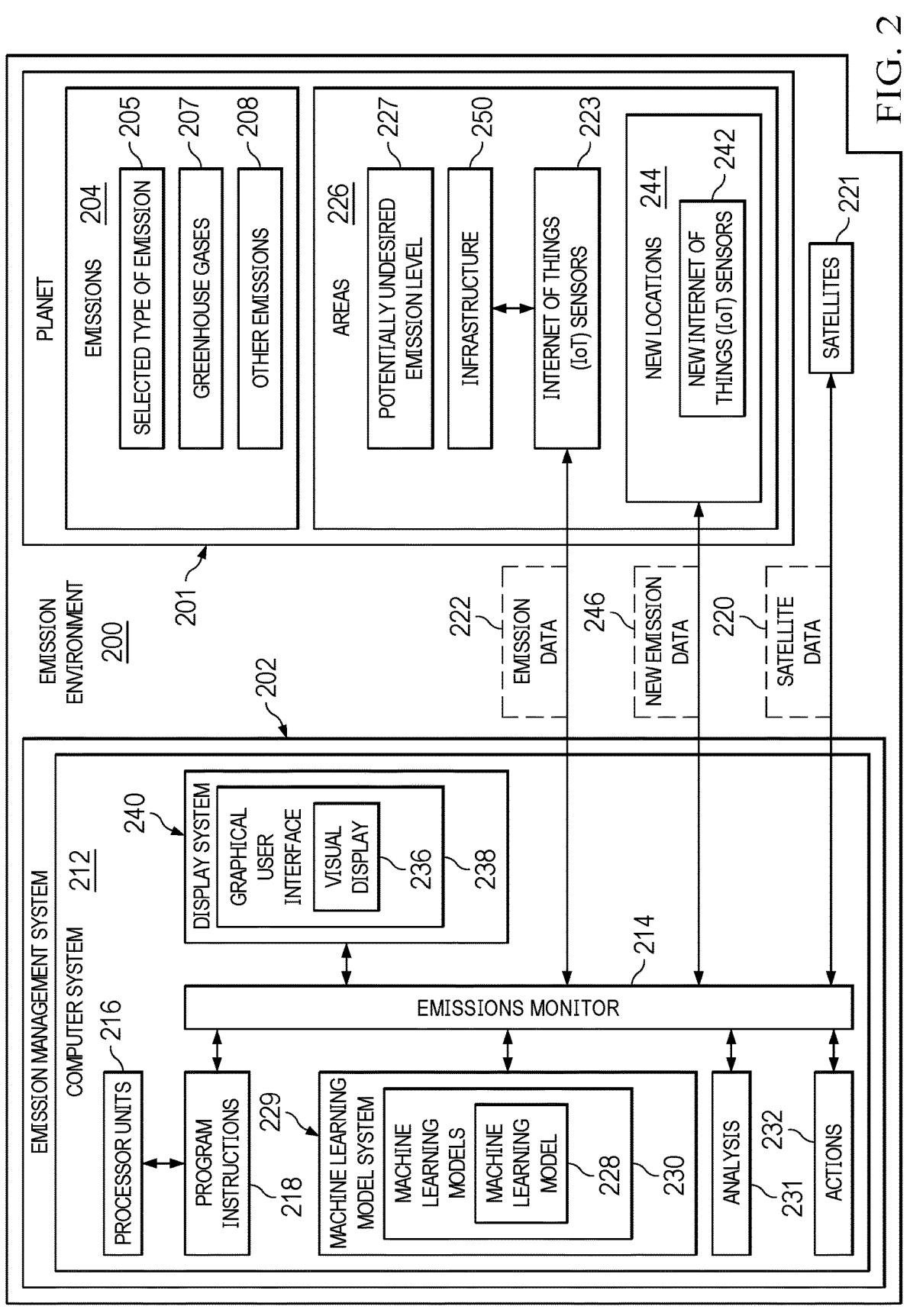
FIG. 2 is a block diagram of an emission environment in accordance with an illustrative embodiment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to the figures, in particular with reference to FIG. 1, a block diagram of a computing environment is depicted in accordance with an illustrative embodiment. Computing environment 100 contains an example of an environment for the execution of at least some of the computer code involved in performing the inventive methods, such as emissions monitor 190. In these examples, emissions monitors can use a machine learning model and Internet of Things (IoT) sensor systems to monitor for emissions in an environment and can also initiate actions in response to detecting the emissions in the environment. In addition to emissions monitor 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and emissions monitor 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in emissions monitor 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in emissions monitor 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative examples recognize and take into account a number of different considerations. For example, current ground-based sensors and monitoring systems can be costly and time-consuming to install and maintain. Further, these currently used systems may not provide sufficient coverage of methane emission sources. Additionally, ground-based monitoring systems may not be able to detect methane leaks in real time. As result, delays can occur in implementing or activating emission reduction measures. Also, the sensors used to detect emissions can be expensive to deploy and difficult to maintain to provide sufficient coverage to detect emissions in different areas.

Satellite images can be used to detect greenhouse gases such as methane. Analysis of these images, however, may not reveal the origin of methane leaks. For example, a satellite image may indicate that methane is present at a tunnel exit. This tunnel exit can be for a complex tunnel system. The identification of the methane at the tunnel exit does not provide any indication of where methane may be present within the tunnel system or a source of methane within the tunnel system.

In the illustrative examples, satellite data such as satellite images can be used to determine the presence of emissions such as methane. This determination can take the form of a prediction made by a machine learning model that a potentially high or undesired level of methane may be present in one or more areas. These areas are not necessarily areas shown in the satellite data as having a high or undesired methane level. With this prediction identifying one or more areas, monitoring can be performed in these areas identified by the machine learning model. In the illustrative example, Internet of Things (IoT) devices can be selected to monitor for methane in the identified areas. These Internet of Things can monitor for methane in real time and provide emission data that can be analyzed in real time to identify actions to reduce methane emissions. Thus, ground sensors specifically deployed for detecting methane emissions are not necessary. Instead, Internet of Things sensors currently present in areas identified for monitoring can be used.

The illustrative examples provide a computer implemented method, apparatus, computer system, and computer program product for monitoring for emissions. In one illustrative example, a computer implemented method monitors a selected type of emission. A number of processor units identifies a set of areas on a planet with a potentially undesired emission level for the selected type of emission using satellite data and a machine learning model trained to identify the potentially undesired emission level for the selected type of emission. The number of processor units selects a number of Internet of Things sensors to monitor for the selected type of emission in the set of areas in real time. The number of processor units analyzes the emissions data generated by the number of Internet of Things sensors from monitoring for the selected type of emission to form an analysis. The number of processor units performs a set of actions using the analysis.

As used herein, a "set of" when used with reference items means one or more items. For example, a set of areas is one or more areas. Also as used herein, a "number of" when used with reference items means one or more items. For example, a number of processor units is one or more processor units.

With reference now to FIG. 2, a block diagram of an emission environment is depicted in accordance with an illustrative embodiment. In this illustrative example, emission environment 200 includes components that can be implemented in hardware such as the hardware shown in computing environment 100 in FIG. 1.

In this illustrative example, emission management system 202 operates to monitor for the presence of emissions 204 on planet 201. Emissions 204 can be for example, greenhouse gases 207. Greenhouse gases 207 are emissions 204 that have an impact on the environment and can include at least one of methane, carbon dioxide, nitrous oxide, or a fluorinated gas.

Emissions 204 can also include other types of emissions that have an impact on the environment or health. For example, other emissions 208 in emissions 204 can include at least one of a particulate matter (PM), a volatile organic compound (VOC), nitrous oxide (NOx), sulfur dioxide ($SO_2$), ozone ($O_3$), and other types of emissions that can affect the environment.

In this illustrative example, emission management system 202 comprises a number of different components. As depicted, emission management system 202 comprises computer system 212 and emissions monitor 214. Emissions monitor 214 is located in computer system 212.

Emissions monitor 214 can be implemented in software, hardware, firmware or a combination thereof. When software is used, the operations performed by emissions monitor 214 can be implemented in program instructions configured to run on hardware, such as a processor unit. When firmware is used, the operations performed by emissions monitor 214 can be implemented in program instructions and data and stored in persistent memory to run on a processor unit. When hardware is employed, the hardware can include circuits that operate to perform the operations in emissions monitor 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In the illustrative example, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. In other words, program instructions 218 are computer readable program instructions.

As used herein, a processor unit in the number of processor units 216 is a hardware device and is comprised of hardware circuits such as those on an integrated circuit that respond to and process instructions and program instructions that operate a computer. A processor unit can be implemented using processor set 110 in FIG. 1. When the number of processor units 216 executes program instructions 218 for a process, the number of processor units 216 can be one or more processor units that are in the same computer or in different computers. In other words, the process can be distributed between processor units 216 on the same or different computers in computer system 212.

Further, the number of processor units 216 can be of the same type or different type of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, emissions monitor 214 can monitor for selected type of emission 205 in emissions 204. For example, selected type of emission 205 can be selected from a group comprising a greenhouse gas, methane, carbon dioxide, nitrous oxide, a fluorinated gas, a particulate matter, a volatile organic compound, nitrous oxide, sulfur dioxide, ozone, and other types of emissions.

As depicted, the monitoring can be performed by emissions monitor 214 using satellite data 220 and emission data 222. In this example, satellite data 220 can be received from a set of satellites 221 and emission data 222 can be received from a number of Internet of Things (IoT) sensors 223.

In this illustrative example, an Internet of Things sensor is an Internet of Things device that can detect and measure physical or chemical phenomena in an environment. An Internet of things device is a physical device that connects to a network such as the Internet. An Internet of Things device can collect and exchange data with other devices or computer systems. Internet of Things devices are often designed to be small, low power, and low cost. An Internet of Things sensor is an Internet of Things device that includes one or more sensors and can monitor for one or more types of emissions 204.

These Internet of Things sensors can be included as part of other objects to transform these objects into the smart objects. Internet of Things sensors 223 can be, for example, a thermostat, a security camera, environmental sensor, manufacturing equipment, a methane detector, a smart sensor, a drone, an autonomous ground vehicle, or other types of devices that include sensors that can detect emissions for selected type of emission 205 in this example.

Further, Internet of Things sensors 223 can be fixed or mobile. For example, an Internet of Things sensor can be attached to a piece of equipment, affixed to a wall, or in some other fixed location. In another example, an Internet of Things sensor can be attached to a mobile platform such as a car, a forklift, a drone, an autonomous ground vehicle, or some other mobile platform.

In this illustrative example, Internet of Things sensors 223 can transmit emission data 222 using various protocols such as those used on the Internet. For example, Internet of Things sensors 223 can transmit emission data 222 to emissions monitor 214 over the Internet using protocols and standards for data exchange and security, such as Hypertext Transfer Protocol (HTTP) or Hypertext Transfer Protocol Secure (HTTPS) for data transfer and encryption or authentication for data protection. These protocols can also be used by satellites 221 to transmit satellite data 220 to emissions monitor 214. Additionally, application programming interfaces (APIs) or other mechanisms can be used to provide communications between emissions monitor 214 and Internet of Things sensors 223 and satellites 221.

In this illustrative example, emissions monitor 214 identifies a set of areas 226 on planet 201 with potentially undesired emission level 227 for selected type of emission 205 using satellite data 220 and machine learning model 228 in machine learning models 230 in machine learning model system 229 trained to identify potentially undesired emission level 227 for selected type of emission 205. In this example, machine learning model 228 is trained to detect selected type of emissions 205. When more than one machine learning model was present in machine learning model system 229, other machine learning models in machine learning models 230 can be trained to detect other types of emissions and emissions 204.

Selected type of emission 205 can is selected from a group comprising a greenhouse gas, methane, carbon dioxide, nitrous oxide, a fluorinated gas, a particulate matter, a volatile organic compound, nitrous oxide, sulfur dioxide, and ozone. In this example, the machine learning model system is comprised of a set of machine learning models 230.

Further in this illustrative example, satellite data 220 can be selected from at least one of a satellite image, spectral data, or concentration data. A satellite image can take a number of different forms. For example, a satellite image can be an optical image that captures visible and near infrared light. In another example, the satellite image can be a radar image. In yet another illustrative example, the satellite image can be a thermal image. These and other types of satellite images can be used in the different illustrative examples.

Spectral data contains measurements of light absorbed and reflected at different wavelengths. Spectral data can be analyzed to identify spectral signature for different types of emissions. For example, methane has a specific spectral signature that can be detected using spectroscopy. Concentration data identifies the concentration of various gases and can be measurements taken from different altitudes. With different altitudes, a three-dimensional model of emission concentrations or different emissions such as methane can be identified.

In this illustrative example, in identifying the set of areas 226, emissions monitor 214 can identify the set of areas 226 on planet 201 with potentially undesired emission level 227 for selected type of emission 205 using satellite data 220, machine learning model 228, and other types of data selected from at least one of weather patterns, land-use patterns, or emissions levels of the selected type of emission. In this example, machine learning model 228 is also trained using this other type of data when this other type data is used to identify the set of areas 226.

In this illustrative example, the set of areas 226 can be areas other than areas in which emissions 204 of selected type of emission 205 do not have undesired emission levels in satellite data 220. In other words, the identification of potentially undesired emission level 227 for selected type of emission 205 can be prediction that this undesired level is present in set of areas 226 but is not shown in satellite data 220.

Emissions monitor 214 can use this identification of the set of areas 226 in which potentially undesired emission level 227 may be present based on a prediction by machine learning model 228 to select Internet of Things sensors 223 that can be used to monitor emissions 204 and generate emission data 222 in the set of areas 226. This monitoring by the set of Internet of Things sensors 223 can be performed to identify emissions 204 for selected type of emission 205 that are not found in satellite data 220.

In this example, the number of Internet of Things sensors 223 selected by emissions monitor 214 monitor for selected type of emission 205 in the set of areas 226 in real time. Further in this example, actions such as monitoring performed in real time means that the actions are performed instantaneously or without any intended delay. In other words, when data is processed in real time, the data is processed as quickly as possible when received without any intentional delay.

Additionally, emissions monitor 214 analyzes emission data 222 generated by the number of Internet of Things sensors 223 from monitoring for selected type of emission 205 to form analysis 231. In this illustrative example, analysis 231 can comprise at least one of a level of emissions for the selected type of emission in a number of locations in the set of areas, an identification of a set of sources for the selected type of emission in the set of areas, a spread of the selected type of emission, a trend for the selected type of emission over time, or other type of analysis.

Emissions monitor 214 performs a set of actions 232 using analysis 231. In this illustrative example, the set of actions 232 can take a number of different forms. For example, the set of actions 232 can be selected from at least one of generating an alert, recommending an action to reduce the selected type of emission, collecting additional emissions data in the set of areas, collecting the additional emissions data in infrastructure in the set of areas, indicating a presence of a leak of the selected type of emissions, adjusting operation of infrastructure identified as generating the potentially undesired level of emissions for the selected type of emission, or other actions.

In one illustrative example, emissions monitor 214 can generate visual display 236 for at least one of the set of actions 232 or analysis 231 in graphical user interface 238 on display system 240. At least one of analysis 231 or visual display 236 can be used to obtain insights into at least one of environmental or economic impacts for different types of emissions. Further, at least one of analysis 231 or visual display 236 can be used create or improve emission reduction strategies for different types of emissions.

In monitoring selected type of emission 205 using the number of Internet of Things sensors 223, emissions monitor 214 identifies infrastructure 250 in the set of areas 226. Emissions monitor 214 selects the number of Internet of Things sensors 223 associated with infrastructure 250 to monitor for selected type of emission 205. In this illustrative example, infrastructure 250 can take a number of different forms. For example, infrastructure 250 can be selected from at least one of a tunnel, a cave, a mine, a building, a manufacturing facility, a power plant, a dam, a farm, an office building, or other structures or land uses.

In some examples, structures in infrastructure 250 can be man-made or natural. One or more structures and infrastructure 250 can be the set of areas 226. In other words, an area in the set of areas can be a manufacturing plant, a farm, or building in some illustrative examples.

In this example, the number of Internet of Things sensors 223 can be associated with infrastructure 250 by being located on infrastructure 250, in infrastructure 250, or near infrastructure 250 such that these Internet of Things sensors can monitor infrastructure 250 for selected type of emission 205.

In monitoring for selected type of emission 205 using the number of Internet of Things sensors 223, emissions monitor 214 can determine a spread of emissions 204 for selected type of emission 205 using emission data 222 received from Internet of Things sensors 223. Emissions monitor 214 can select new Internet of Things sensors 242 in new locations 244 to monitor for selected type of emission 205 based on the spread of selected type of emission 205. In this example, new Internet of Things sensors 242 generate new emission data 246 used in analysis 231. This identification of new Internet of Things sensors 242 and monitoring to generate new emission data 246 can be repeated any number of times needed to provide desired monitoring for selected type of emission 205.

When selected type of emission 205 is methane, Internet of Things sensors 223 can be selected as sensors that detect methane concentrations in the air. Internet of Things sensors 223 can also be actuators configured to shut off valves or activate an emission control system in response to high methane levels. For example, the emission control system can use methane sensors, which are capable of detecting methane concentrations in the parts per million range. These sensors are examples of Internet of Things sensors 223 from which emission data in the form of methane emissions can be monitored.

Thus, satellite data can be used to identify areas of interest in which a potential undesired emission level may be present for a particular type of emission. Internet of Things sensors can then be selected in a set of areas to monitor for emissions. Emission data received from these sensors can be used to determine whether an undesired level of emission is actually present in the set of areas. In this example, this type of monitoring is performed in real time and can increase the speed at which actions can be taken to reduce undesired emissions such as methane leaks.

Additionally, emission management system 202 can also initiate a set of actions 232 in response to detecting emissions 204. As used herein, a "set of" when used with reference items means one or more items. For example, a set of actions 232 is one or more of actions 232.

In this example, machine learning models and Internet of Things sensors can be integrated to provide real-time monitors monitoring and notification of different types of emissions. The data collected can also be analyzed to identify analytics and insights on emissions and sources of emissions that can affect the environment and health. Further, this information from this type of monitoring can also be used to track the progress of emission reduction strategies and policies already in place.

In one illustrative example, one or more solutions are present that overcome a problem with actively and efficiently monitoring for emissions. As a result, one or more illustrative examples can enable identifying one or more areas in which a potential undesired level of omission is present for a particular type of emission. For example, a prediction can be made as to whether an undesired level of methane emissions is potentially present in one or more areas by a machine learning model. Internet of Things sensors in those areas can be selected to perform monitoring. In this manner, the illustrative examples can rely on presently available Internet of Things sensors that may be in different locations without needing support to deploy and maintain sensors specifically for monitoring for emissions. In other words, Internet of Things sensors present in the areas identified for monitoring can be used in the illustrative examples.

Computer system 212 can be configured to perform at least one of the steps, operations, or actions described in the different illustrative examples using software, hardware, firmware or a combination thereof. As a result, computer system 212 operates as a special purpose computer system in which emissions monitor 214 in computer system 212 enables monitoring for emissions using a machine learning model and Internet of Things sensors. The machine learning model can be used to predict areas with potential undesired emission levels of a type of emission In particular, emissions monitor 214. The Internet of Things sensors in the set of areas can be used to perform monitoring. When the Internet of Things of sensors have controllable mobility, those Internet of things sensors can be controlled to move to the set of areas to monitor for the emissions.

In the illustrative example, the use of emissions monitor 214 in computer system 212 integrates processes into a practical application for monitoring for emissions that increases the performance of computer system 212 to detect different types of emissions in real time and performing actions based on monitoring the emissions. In other words, emissions monitor 214 in computer system 212 is directed to a practical application of processes integrated into emissions monitor 214 in computer system 212 that identifies one or more areas having a potentially undesired emission level for a type of emission, such as methane. Internet of Things sensors in those areas can be selected to monitor for methane and generate emission data in real-time. This emission data can be analyzed in real time to perform actions to mitigate emissions in the event that the emissions are greater than some desired level or threshold. In this manner, emissions monitor 214 in computer system 212 provides steps for a practical application of monitoring for a selected type of emission.

Figure 3:
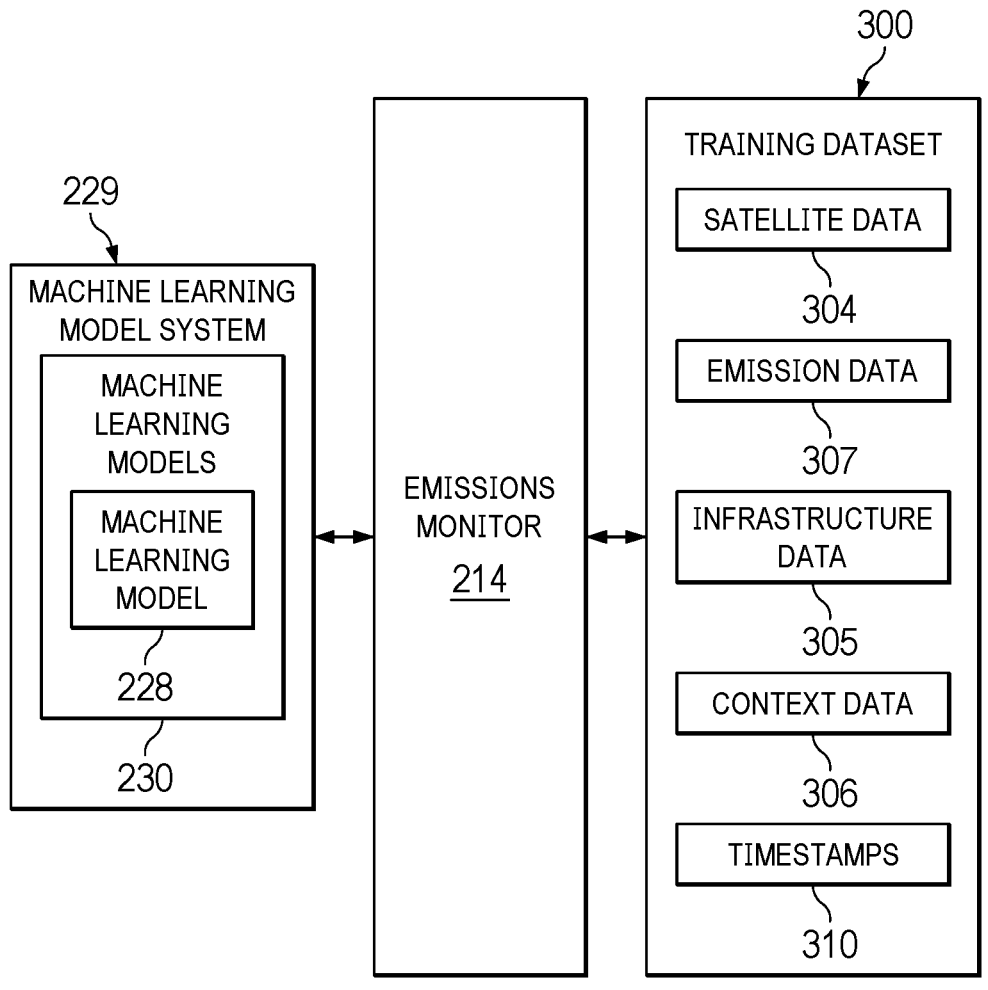
FIG. 3 is an illustration of training a machine learning model to identify potentially undesired emission levels in accordance with an illustrative embodiment.

Turning next to FIG. 3, an illustration of training a machine learning model to identify potentially undesired emission levels is depicted in accordance with an illustrative embodiment. In the illustrative examples, the same reference numeral may be used in more than one figure. This reuse of a reference numeral in different figures represents the same element in the different figures.

A machine learning model in machine learning models 230 in machine learning model system 229 is a type of artificial intelligence model that can learn without being explicitly programmed. A machine learning model can learn based on training data input into the machine learning model.

The machine learning model can learn using various types of machine learning algorithms. The machine learning algorithms include at least one of a supervised learning, an unsupervised learning, a feature learning, a sparse dictionary learning, an anomaly detection, a reinforcement learning, a recommendation learning, or other types of learning algorithms. Examples of machine learning models include an artificial neural network, a convolutional neural network, a decision tree, a support vector machine, a regression machine learning model, a classification machine learning model, a random forest learning model, a Bayesian network, a genetic algorithm, and other types of models. These machine learning models can be trained using data and process additional data to provide a desired output.

In this illustrative example, emissions monitor 214 can train machine learning model 228 in machine learning models 230 in machine learning model system 229 using training dataset 300 to determine the presence of potentially undesired emission level 227. In this example, the determination is a prediction of where potentially undesired emission level 227 may be present when this undesired emission level is not found in satellite data input into machine learning model 228.

Training dataset 300 can be created using historical data of various types for training machine learning model 228 to predict potential in undesired emission levels for selected type of emission 205. As depicted, training dataset 300 includes satellite data 304. This satellite data historical data that can be obtained from different satellite feeds. Satellite data 304 includes satellite images. Satellite data 304 can also include at least one of spectral data, concentration data, or other data that a satellite can generate regarding emissions 204 for selected type of emission 205. For example, if selected type of emission 205 is methane, the satellite data 304 can include data that shows the presence of methane as well as satellite data 304 that shows an absence of methane for training purposes.

Additionally, training dataset 300 can also include infrastructure data 305. Infrastructure data 305 is about infrastructure for which emissions can be monitored. For example, infrastructure data 305 can be data about at least one of a tunnel, a cave, a mine, a building, a manufacturing facility, a power plant, a dam, a farm, an office building, or other structures or land uses. Infrastructure data 305 can include geospatial data describing the infrastructure. For example, infrastructure data 305 can include geospatial data describing a network of tunnels, the layout of a manufacturing facility, or other structures. Further, this infrastructure data can also include an identification of types of equipment, pipes, valves in a pipe system, and other equipment and structures.

Context data 306 can be included in training dataset 300 to provide context for satellite data 220. For example, this context data can include at least one of weather data, geospatial data about land masses and bodies of water in the environment, elevation maps, and other information.

Further, training dataset can also include historical data 302 in the form of emission data 307. Emission data 307 in this example is generated by Internet of Things sensors or other sensors. In this example, emission data 307 and satellite data 304 can include timestamps 310.

In this example, the data in training dataset 300 can be correlated using timestamps 310. Timestamps 310 enables correlating data in training dataset to each other. For example, timestamps can correlate emission data 307 and satellite data 304 to each other for use in training machine learning model 228. In this depicted example, machine learning model 228 can be trained to learn patterns or correlations between satellite data 304 and emission data 307.

For example, selected patterns of satellite data 304 can be used to predict high levels or undesired levels of emissions by comparing the patterns in the satellite data 304 to patterns of emission data 307. This ability to correlate data can enable machine learning model 228 to be trained to predict one or more areas that may have potentially undesired emission levels for a type of emission such as methane.

A training dataset, such as training dataset 300, can be created for each type of emission that is to be determined using a machine learning model in machine learning models 230. As a result, machine learning models 230 in machine learning model system 229 can operate to determine areas in which Internet of Things sensors should be used to monitor for emissions at different emission types and generates emission data for those emission types to determine whether undesired emission levels are present for one or more of those emission types in the different areas identified by machine learning model system 229 using the different machine learning models in machine learning models 230 that have been trained to determine your these areas for the different types of emissions.

In this illustrative example, emissions monitor 214 is trained using at least one of a supervised learning or unsupervised learning algorithms. For example, these types of algorithms can be used to train machine learning models 230 to detect a type of emission such as methane and determine areas from which monitoring should be performed for potentially undesired emission levels of methane using satellite data such as satellite images.

For example, supervised learning algorithms, such as decision trees and support vector machines, can classify satellite images based on the presence or absence of methane. Unsupervised learning algorithms, such as clustering algorithms, can identify patterns and anomalies in the satellite data, highlighting areas with high methane emission levels.

The illustration of emission environment 200 in the different components in FIGS. 2-3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, emissions monitor 214 can monitor for emissions for additional types of emissions in addition to or in place of selected type of emission 205. With additional types of emissions, additional machine learning models in machine learning models 230 can be used to make predictions and perform analysis for these additional types of emissions.

In the illustrative examples, emission management system 202 in FIG. 2 can be used in a number of different situations to detect different types of emissions. For example, the system can be used to detect methane emissions for a natural gas facility. The natural gas facility can include a methane emission control system implementing emission management system 202 in FIG. 2. In this example, the methane emission control system can use satellite images, one or more machine learning models, and Internet of Things sensors to continuously monitor for methane emissions in real time. The system can generate an alert when emissions exceed a threshold. As a result, this methane emission control system can be used to implement emission reduction strategies and also make adjustments as needed in response to detecting emissions that exceed a selected level.

With this system, methane leaks from the natural gas facility can be detected more quickly enabling prompt actions to reduce emissions. As a result, the amount of methane escaping into the atmosphere can be prevented or reduced.

In another example, an agricultural company includes a network of farms with livestock. A methane emission control system can be implemented using emission management system 202 in FIG. 2. This methane emission control system can be implemented to monitor and control methane emissions at farms in the network of farms. In this example, satellite images, one or more machine learning models, and Internet of Things sensors to continuously monitor for methane emissions in real time. When emissions exceed a threshold, an alert can be generated.

Further, real time data on methane emissions can enable the agricultural company to track the effectiveness of different emission reduction strategies and also enable making adjustments as needed. The agriculture company can more quickly detect methane leaks and take actions to reduce emissions using a methane emission control system implementing emissions monitor 214 in these illustrative examples.

In yet another illustrative example, an oil and gas company can implement a methane emission control system that includes emission management system 202 in FIG. 2 to control methane emissions across different facilities in its operations. In this example, satellite images, one or more machine learning models, and Internet of Things sensors to continuously monitor for methane emissions in real time. Alerts and actions can be taken to reduce methane emissions when those emissions exceed a threshold in different locations in which the oil gas company operates. With the real time data on methane emissions, the oil and gas company can also track the effectiveness of emission reduction strategies and make adjustments as needed.

Turning to FIG. 4, a flowchart of a process for methane emission control is depicted in accordance with an illustrative embodiment. The process in FIG. 4 can be implemented in hardware, software, or both. When implemented in software, the process can take the form of program instructions that are run by one of more processor units located in one or more hardware devices in one or more computer systems. For example, the process can be implemented in emissions monitor 214 in computer system 212 in FIG. 2. The process in this flowchart is an example of one type of emission that can be monitored for an manage in the illustrative examples.

The process begins by receiving satellite images (step 400). The process sends the satellite images to the machine learning model system for analysis (step 402). This machine learning model system can be, for example, machine learning model system 229 and can include one or more machine learning models. In this example, these machine learning models have been trained to analyze methane emissions in satellite images. In other illustrative examples, the machine learning models can also analyze other types of satellite data in addition to or in place of satellite images.

The process receives an identification of areas for at least one of potentially high emission levels of methane or sources of methane (step 404). The process determines whether Internet of Things sensors are present in the areas (step 406). In step 406, the determination can include determining whether Internet of Things sensors are present in locations in the areas where at least one of potentially high levels of methane or sources of methane are present. In other examples, the determination can identify Internet of Things sensors in the areas without using a more granular identification these sensors in specific locations in the areas.

If Internet of Things sensors are present in the areas, the process selects Internet of Things sensors within the areas to monitor for methane emissions (step 408). In step 408, the selection communicating with the Internet with Things devices to instruct the Internet of Things sensors to monitor for methane emissions and return emissions data regarding methane emissions detected by the sensors. On the other hand, if Internet of Things sensors are not present in step 406, the process returns to step 404.

The process receives emissions data from the Internet of Things sensors in real time (step 410). The process analyzes the emissions data to determine whether a potentially high level of methane is present indicating the presence of a methane week (step 412). If a methane leak is not present, the process returns to step 410.

Otherwise, the process sends a notification to one or more parties or authorities regarding the presence of the methane leak (step 414). The process terminates thereafter.

Figure 5:
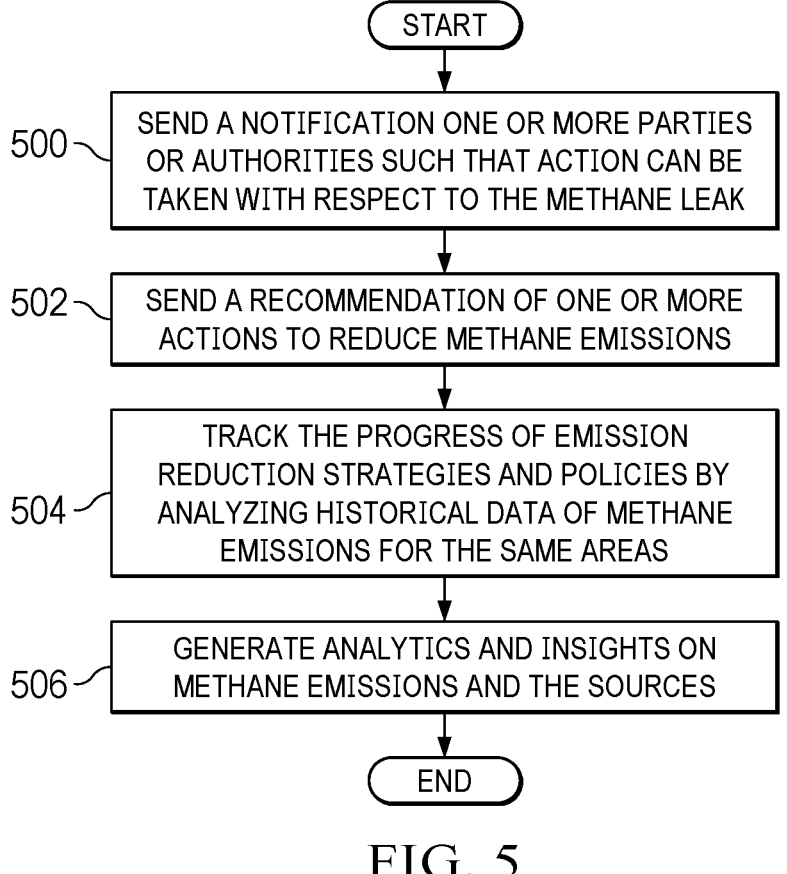
FIG. 5 is a flowchart of a process for performing actions using methane emission data in accordance with an illustrative embodiment.

Turning to FIG. 5, a flowchart of a process for performing actions using methane emission data is depicted in accordance with an illustrative embodiment. The process in this flowchart are of some actions that can be performed using the satellite data and methane emission data. The process in FIG. 5 can be implemented in hardware, software, or both. When implemented in software, the process can take the form of program instructions that are run by one of more processor units located in one or more hardware devices in one or more computer systems. For example, the process can be implemented in emissions monitor 214 in computer system 212 in FIG. 2. The process in this flowchart is an example of one type of emission that can be monitored for an manage in the illustrative examples.

In this illustrative example, the process sends a notification to one or more parties or authorities such that action can be taken with respect to the methane leak (step 500). The process sends a recommendation of one or more actions to reduce methane emissions (step 502). In step 502, the recommendation can be sent to the same parties or different parties. For example, the notification can be sent to an on-site maintenance team in the area of the methane leak while the recommendation can be sent to a management team that manages the operations of the facility where the methane leak is identified.

The process tracks the progress of emission reduction strategies and policies by analyzing historical data of methane emissions for the same areas (step 504). This progress data can be stored for review or analysis. The process also generates analytics and insights on methane emissions and the sources (step 506). The process terminates thereafter.

The different actions in this flowchart in FIG. 5 are examples of some actions that can be formed based on satellite data received from satellites and emissions data received from Internet of Things devices. In other examples, other actions may be performed in addition to or in place of the ones described in this process. For example, a warning or alert can be sent to people in selected areas about the presence of the methane leak.

Figure 6:
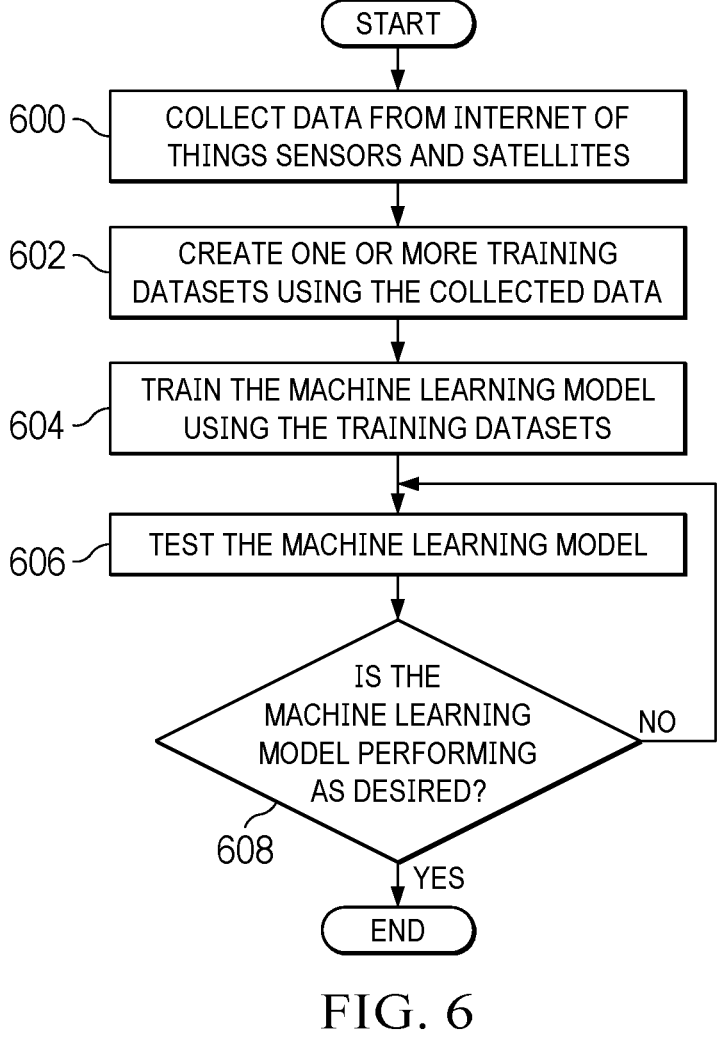
FIG. 6 is a flowchart of a process for training a machine learning model to identify areas with potential and undesired emission levels for a selected type of emission in accordance with an illustrative embodiment.

With reference next to FIG. 6, a flowchart of a process for training a machine learning model to identify areas with potential and undesired emission levels for a selected type of emission is depicted in accordance with an illustrative embodiment. The process in FIG. 6 can be implemented in hardware, software, or both. When implemented in software, the process can take the form of program instructions that are run by one of more processor units located in one or more hardware devices in one or more computer systems. For example, the process can be implemented in emissions monitor 214 in computer system 212 in FIG. 2. This process can be used to train one or more machine learning models in machine learning model system 229 in FIG. 2.

The process begins by collecting data from the Internet of Things sensors and satellites (step 600). In step 600, this data can be collected from data streams or feeds from these devices or can be located in a historical database. This data may include labels and some data may not include labels.

The process creates one or more training datasets using the collected data (step 602). The process trains the machine learning model using the training datasets (step 604). In step 604, the training can use techniques such as cross-validation or k-fold cross-validation to evaluate the performance of the algorithms on multiple sets of data, or metrics such as accuracy, precision, or recall can be used to measure the performance of the algorithms. For example, the training may use 10-fold cross-validation to evaluate the performance of a support vector machine model on the training data, with the model being trained on 9 folds and tested on the remaining fold.

This training can also include optimizing the performance of the machine learning model. For example, techniques such as hyperparameter tuning or feature engineering can be used in the training process. This optimization can involve the use of techniques such as grid search or random search to optimize the hyperparameters of the machine learning model, involve the development of new features or the selection of existing features to improve the performance of the machine learning model. For example, a grid search can be used to tune the hyperparameters of a random forest model, with the hyperparameters including the number of trees in the forest and the maximum depth of each tree. The training can also use feature selection techniques such as mutual information or variance thresholding to select the most relevant features for the model.

The process tests the machine learning model (step 606). In step 606, the testing can be performed using subset of the data collected from the satellites and Internet of Things sensors. This subset of data can be used to determine if the machine learning model is performing as expected and is ready for deployment.

In step 606, the test set can be used to evaluate the generalization error of the machine learning model, which is a measure of how well the machine learning model performs on new data. The machine learning model's performance on the test dataset can be compared to a baseline model or to the performance of the machine learning model on the training and validation sets to determine if the machine learning model is overfitting or underfitting the data.

A determination is made as to whether the machine learning model performs as desired (step 608). If the machine learning model is performing as desired, the process terminates. Otherwise, the process returns to step 606 to perform additional optimizations.

Turning next to FIG. 7, a flowchart of a process for monitoring for a selected type of emission is depicted in accordance with an illustrative embodiment. The process in FIG. 7 can be implemented in hardware, software, or both. When implemented in software, the process can take the form of program instructions that are run by one of more processor units located in one or more hardware devices in one or more computer systems. For example, the process can be implemented in emissions monitor 214 in computer system 212 in FIG. 2.

The process begins by identifying a set of areas on a planet with a potentially undesired emission level for the selected type of emission using satellite data and a machine learning model trained to identify the potentially undesired emission level for the selected type of emission (step 700). In step 700, the selected type of emission can be selected from a greenhouse gas, methane, carbon dioxide, nitrous oxide, a fluorinated gas, a particulate matter, a volatile organic compound, nitrous oxide, sulfur dioxide, ozone, and other emissions of interest that can adversely affect the environment or health. The satellite data can be selected from at least one of a satellite image, spectral data, concentration data, or other type of satellite data.

The process selects a number of Internet of Things sensors to monitor for the selected type of emission in the set of areas in real time (step 702). In step 702, the selection of the Internet of Things can include sending communications with instructions or commands for the selected Internet of Things sensors to monitor for the selected type of emission, generate emission data from the monitoring, and transmit that data back to emissions monitor 214 in FIG. 2. This monitoring can be performed continuously in real time in these examples.

The process analyzes emissions data generated by the number of Internet of Things sensors from monitoring for the selected type of emission to form an analysis (step 704). The analysis in step 704 can comprise at least one of a level of emissions for the selected type of emission in a number of locations in the set of areas, an identification of a set of sources for the selected type of emission in the set of areas, a spread of the selected type of emission, a trend for the selected type of emission over time, or other type of analysis.

The process performs a set of actions using the analysis (step 706). The process terminates thereafter. In step 706, the set of actions can be selected from at least one of generating an alert, recommending an action to reduce the selected type of emission, collecting additional emissions data in the set of areas, collecting the additional emissions data in infrastructure in the set of areas, indicating a presence of a leak of the selected type of emission, or adjusting operation of equipment identified as generating the potentially undesired level of emissions for the selected type of emission.

Figure 8:
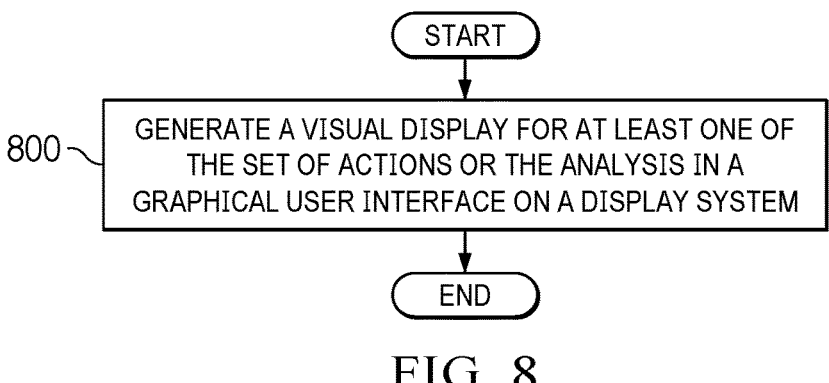
FIG. 8 is a flowchart of a process for displaying results from analyzing emission data in accordance with an illustrative embodiment.

With reference now to FIG. 8, a flowchart of a process for displaying results from analyzing emission data is depicted in accordance with an illustrative embodiment. This flowchart is an example of an additional step that can be performed with the steps in FIG. 7.

The process generates a visual display for at least one of the set of actions or the analysis in a graphical user interface on a display system (step 800). The process terminates thereafter.

Figure 9:
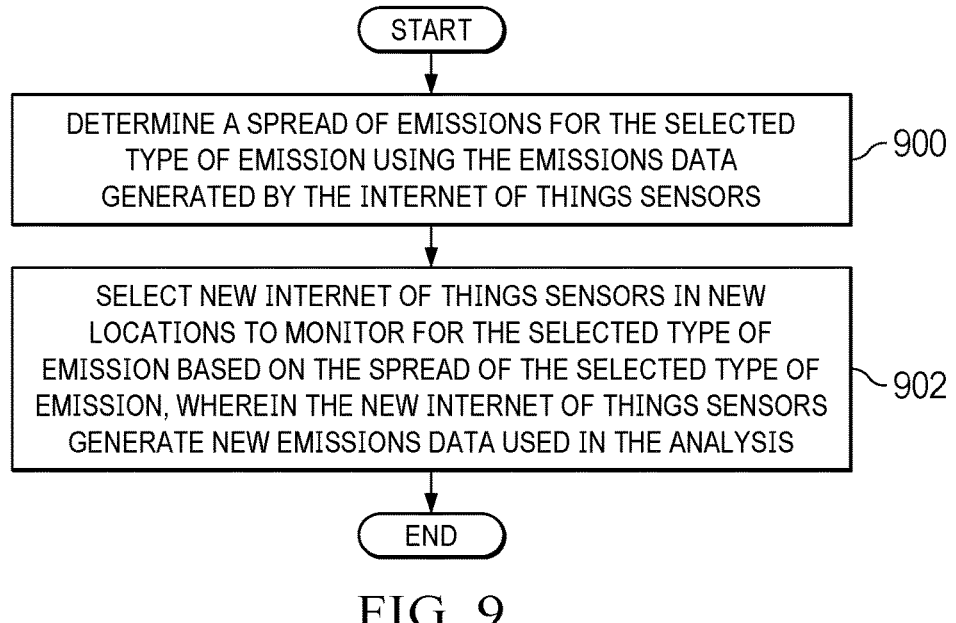
FIG. 9 is a flowchart of process for monitoring for emissions in accordance with an illustrative embodiment.

In FIG. 9, a flowchart of process for monitoring for emissions is depicted in accordance with an illustrative embodiment. The process in this flowchart is an example of additional steps that can be formed with the steps in FIG. 7.

The process determines a spread of emissions for the selected type of emission using the emissions data generated by the Internet of Things sensors (step 900). In step 900, a flow or spread of the type of emission can be determined from monitoring for emissions data for the type of emission over time.

The process selects new Internet of Things sensors in new locations to monitor for the selected type of emission based on the spread of the selected type of emission, wherein the new Internet of Things sensors generate new emissions data used in the analysis (step 902). The process terminates thereafter.

Turning next to FIG. 10, a flowchart of a process for identifying areas for monitoring is depicted in accordance with an illustrative embodiment. The step in this flowchart is an example of an implementation for step 700 in FIG. 7.

The process identifies the set of areas on the planet with the potentially undesired emission level for the selected type of emission using the satellite data, the machine learning model, and at least one of weather patterns, land-use patterns, or emissions levels of the selected type of emission (step 1000). The process terminates thereafter. In this example, the machine learning model has also been trained to use at least one of weather patterns, lands patterns, when emission levels of the selected type of emission in addition to the satellite data to predict where potentially undesired emission levels for the selected type of emission may occur.

With reference now to FIG. 11, a flowchart of a process for identifying a set of locations in infrastructure to monitor for emissions is depicted in accordance with an illustrative embodiment. The process in this flowchart is an example of an implementation for step 702 in FIG. 7.

The process identifies a set of locations in infrastructure in the set of areas for the potentially undesired emission level for the selected type of emission using satellite data and a machine learning model trained to identify the potentially undesired emission level for the selected type of emission (step 1100). The process terminates thereafter.

The infrastructure in step 1100 can be structures or facilities that can generate the selected type of emission. In this example, the structures in can be a man-made structure such as a building, a manufacturing facility, a power plant, a mine, an oil well, a gas pipeline, a farm, a dam, or other structure. The structures can also be natural structures such as a cave.

In this illustrative example, locations in the infrastructure can be where a potentially high level of emission for the selected type of emission is predicted to be present or identified by the machine learning model. The set of locations can also be used for a source of the type of emission. For example, a location in the set of locations can be the location of a valve in the pipeline, the piece of manufacturing equipment, a generator, or other source of emissions.

In one example, the machine learning model identifies a structure such as tunnel system. The machine learning model can also identify one or more locations in the tunnel system where an undesired level of the selected type of emission can be present. This identification is made even though the satellite data does not show emissions within the tunnel structure.

With reference now to FIG. 12, a flowchart of a process for selecting Internet of Things sensors to monitor for emissions is depicted in accordance with an illustrative embodiment. The process in this flowchart is an example of an implementation for step 702 in FIG. 7.

The process selects the number of Internet of Things sensors in the set of locations in the infrastructure to monitor for the selected type of emission (step 1200). The process terminates thereafter.

Figure 13:
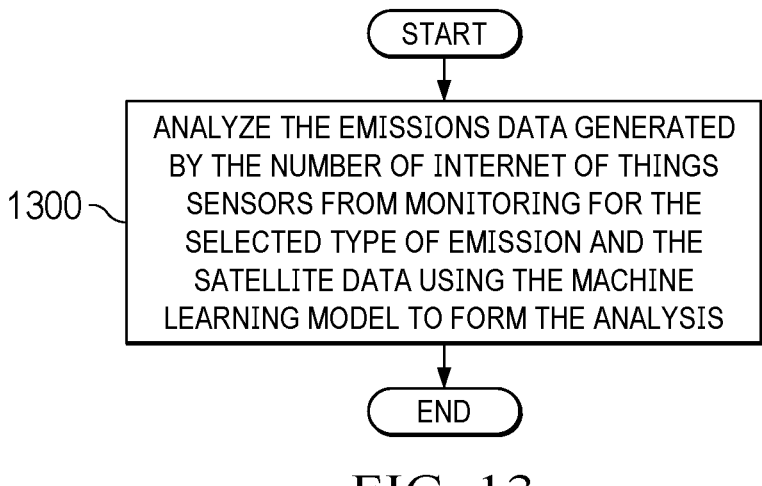
FIG. 13 is a flowchart of a process for analyzing the emissions data in accordance with an illustrative embodiment.

Next in FIG. 13, a flowchart of a process for analyzing the emissions data is depicted in accordance with an illustrative embodiment. The process in this figure is an example of an implementation for step 704 in FIG. 7.

The process analyzes the emissions data generated by the number of Internet of Things sensors from monitoring for the selected type of emission and the satellite data using the machine learning model to form the analysis (step 1300). The process terminates thereafter. In this example, the satellite data is also used in addition to the emissions data for the analysis.

Figure 14:
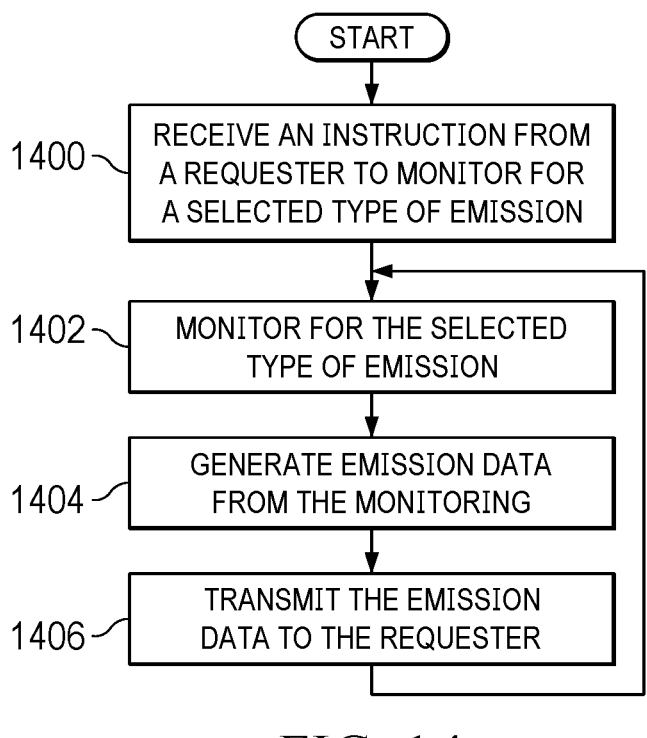
FIG. 14 is a flowchart of a process for monitoring for emissions using Internet of Things sensors in accordance with an illustrative embodiment.

With reference to FIG. 14, a flowchart of a process for monitoring for emissions using Internet of Things sensors is depicted in accordance with an illustrative embodiment. The process in this flowchart can be performed with the steps in FIG. 7 using Internet of Things sensors. For example, the steps can be implemented in Internet of Things sensors 223 in FIG. 2.

The process receives an instruction from a requester to monitor for a selected type of emission (step 1400). In this example, the requester can be an emission monitor. The process monitors for the selected type of emission (step 1402). The process generates emission data from the monitoring (step 1404).

The process transmits the emission data to the requester (step 1406) and returns to step 1402. This process can be performed continually in real time to generate emission data from monitoring for the type of emission over time.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 15:
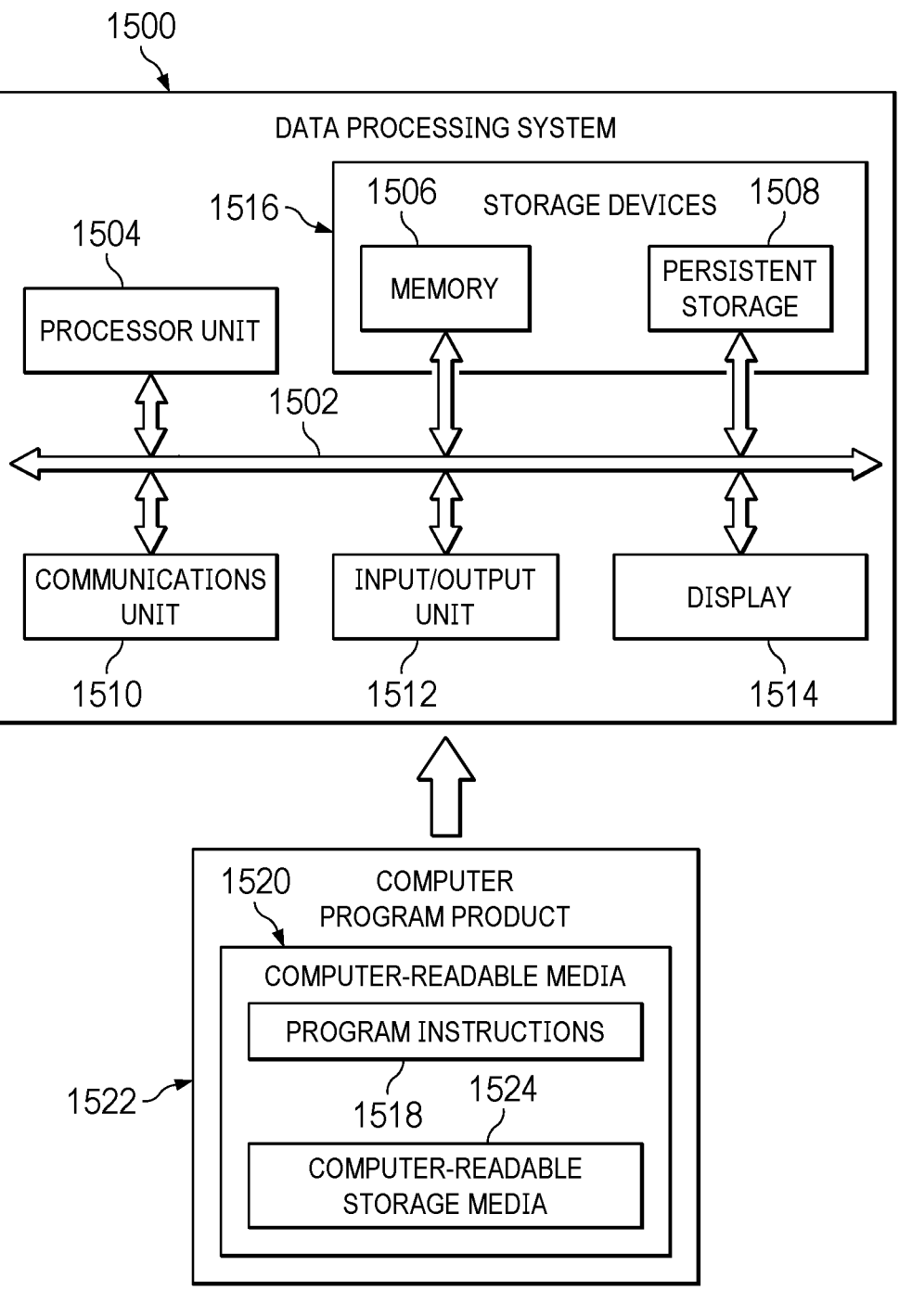
FIG. 15 is a block diagram of a data processing system in accordance with an illustrative embodiment.

Turning now to FIG. 15, a block diagram of a data processing system is depicted in accordance with an illustrative embodiment. Data processing system 1500 can be used to implement computers and computing devices in computing environment 100 in FIG. 1. Data processing system 1500 can also be used to implement computer system 212 in FIG. 2. In this illustrative example, data processing system 1500 includes communications framework 1502, which provides communications between processor unit 1504, memory 1506, persistent storage 1508, communications unit 1510, input/output (I/O) unit 1512, and display 1514. In this example, communications framework 1502 takes the form of a bus system.

Processor unit 1504 serves to execute instructions for software that can be loaded into memory 1506. Processor unit 1504 includes one or more processors. For example, processor unit 1504 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1504 can be implemented using one or more heterogeneous processor systems in which a main processor is present with secondary processors on a single chip. As another illustrative example, processor unit 1504 can be a symmetric multi-processor system containing multiple processors of the same type on a single chip.

Memory 1506 and persistent storage 1508 are examples of storage devices 1516. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1516 may also be referred to as computer readable storage devices in these illustrative examples. Memory 1506, in these examples, can be, for example, a random-access memory or any other suitable volatile or non-volatile storage device. Persistent storage 1508 may take various forms, depending on the particular implementation.

For example, persistent storage 1508 may contain one or more components or devices. For example, persistent storage 1508 can be a hard drive, a solid-state drive (SSD), a flash memory, a rewritable optical disk, a rewritable magnetic tape, or some combination of the above. The media used by persistent storage 1508 also can be removable. For example, a removable hard drive can be used for persistent storage 1508.

Communications unit 1510, in these illustrative examples, provides for communications with other data processing systems or devices. In these illustrative examples, communications unit 1510 is a network interface card.

Input/output unit 1512 allows for input and output of data with other devices that can be connected to data processing system 1500. For example, input/output unit 1512 may provide a connection for user input through at least one of a keyboard, a mouse, or some other suitable input device. Further, input/output unit 1512 may send output to a printer. Display 1514 provides a mechanism to display information to a user.

Instructions for at least one of the operating systems, applications, or programs can be located in storage devices 1516, which are in communication with processor unit 1504 through communications framework 1502. The processes of the different embodiments can be performed by processor unit 1504 using computer-implemented instructions, which may be located in a memory, such as memory 1506.

These instructions are referred to as program instructions, computer usable program instructions, or computer readable program instructions that can be read and executed by a processor in processor unit 1504. The program instructions in the different embodiments can be embodied on different physical or computer readable storage media, such as memory 1506 or persistent storage 1508.

Program instructions 1518 are located in a functional form on computer readable media 1520 that is selectively removable and can be loaded onto or transferred to data processing system 1500 for execution by processor unit 1504. Program instructions 1518 and computer readable media 1520 form computer program product 1522 in these illustrative examples. In the illustrative example, computer readable media 1520 is computer readable storage media 1524.

Computer readable storage media 1524 is a physical or tangible storage device used to store program instructions 1518 rather than a medium that propagates or transmits program instructions 1518. Computer readable storage media 1524, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1518 can be transferred to data processing system 1500 using a computer readable signal media. The computer readable signal media are signals and can be, for example, a propagated data signal containing program instructions 1518. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 1520" can be singular or plural. For example, program instructions 1518 can be located in computer readable media 1520 in the form of a single storage device or system. In another example, program instructions 1518 can be located in computer readable media 1520 that is distributed in multiple data processing systems. In other words, some instructions in program instructions 1518 can be located in one data processing system while other instructions in program instructions 1518 can be located in one data processing system. For example, a portion of program instructions 1518 can be located in computer readable media 1520 in a server computer while another portion of program instructions 1518 can be located in computer readable media 1520 located in a set of client computers.

The different components illustrated for data processing system 1500 are not meant to provide architectural limitations to the manner in which different embodiments can be implemented. In some illustrative examples, one or more of the components may be incorporated in or otherwise form a portion of, another component. For example, memory 1506, or portions thereof, may be incorporated in processor unit 1504 in some illustrative examples. The different illustrative embodiments can be implemented in a data processing system including components in addition to or in place of those illustrated for data processing system 1500. Other components shown in FIG. 15 can be varied from the illustrative examples shown. The different embodiments can be implemented using any hardware device or system capable of running program instructions 1518.

Thus, illustrative embodiments provide a computer implemented method, computer system, and computer program product for monitoring for a selected type of emission. A set of areas on a planet with a potentially undesired emission level for the selected type of emission is identified using satellite data and a machine learning model trained to identify the potentially undesired emission level for the selected type of emission. A number of Internet of Things sensors is selected to monitor for the selected type of emission in the set of areas in real time. Emissions data generated by the number of Internet of Things sensors from monitoring for the selected type of emission is analyzed to form an analysis. A set of actions is performed using the analysis.

In illustrative examples, satellite data can be used to identify areas of interest in which a potential undesired emission level may be present for a particular type of emission. Internet of Things sensors in a set of areas can be selected to monitor for emissions. Emission data received from these sensors can be used to determine whether an undesired level of emission is actually present in the set of areas. In this example, this type of monitoring is performed in real time and can increase the speed at which actions can be taken to reduce undesired emissions such as methane leaks. In this manner, machine learning models and Internet of Things sensors can be integrated to provide real-time monitors monitoring and notification of different types of emissions. The data collected can also be analyzed to identify analytics and insights on emissions and sources of emissions that can affect the environment and health. Further, this information from this type of monitoring can also be used to track the progress of emission reduction strategies and policies already in place.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for monitoring a selected type of emission, the computer implemented method comprising: training, by a number of processor units, a machine learning model using historical satellite spectral data correlated with known emission levels for the selected type of emission, wherein the machine learning model is configured to identify spectral signatures indicative of potentially undesired emission levels;

analyzing, by the number of processor units, current satellite data from a planetary region using the trained machine learning model to identify a set of areas on a planet with spectral signatures matching the potentially undesired emission level for the selected type of emission;

identifying, by the number of processor units, infrastructure in the set of areas from spectral signatures in the satellite data;

selecting, by the number of processor units, a number of existing Internet of Things sensors associated with the infrastructure to monitor for the selected type of emission in the set of areas in real time, wherein the selecting comprises choosing from sensors already deployed in the infrastructure;

analyzing, by the number of processor units, emissions data generated by the number of Internet of Things sensors from monitoring for the selected type of emission to form an analysis; and performing, by the number of processor units, a set of actions using the analysis.

2. The computer implemented method of claim 1 further comprising:

generating, by the number of processor units, a visual display for at least one of the set of actions or the analysis in a graphical user interface on a display system and wherein the analysis comprises at least one of: a level of emissions for the selected type of emission in a number of locations in the set of areas, an identification of a set of sources for the selected type of emission in the set of areas, a spread of the selected type of emission, or a trend for the selected type of emission over time.

3. The computer implemented method of claim 1 further comprising:

determining, by the number of processor units, a spread of emissions for the selected type of emission using the emissions data generated by the Internet of Things sensors; and selecting, by the number of processor units, new Internet of Things sensors in new locations to monitor for the selected type of emission based on the spread of the selected type of emission, wherein the new Internet of Things sensors generate new emissions data used in the analysis.

4. The computer implemented method of claim 1, wherein identifying, by the number of processor units, the set of areas further comprises:

identifying, by a number of processor units, the set of areas on the planet with the potentially undesired emission level for the selected type of emission using the satellite data, the machine learning model, and at least one of weather patterns, land-use patterns, or emissions levels of the selected type of emission.

5. The computer implemented method of claim 4, wherein identifying, by the number of processor units, the set of areas further comprises:

identifying, by the number of processor units, a set of locations in infrastructure in the set of areas for the potentially undesired emission level for the selected type of emission using satellite data and a machine learning model trained to identify the potentially undesired emission level for the selected type of emission.

6. The computer implemented method of claim 5, wherein selecting, by the number of processor units, the number of Internet of Things sensors further comprises:

selecting, by the number of processor units, the number of Internet of Things sensors in the set of locations in the infrastructure to monitor for the selected type of emission.

7. The computer implemented method of claim 1, wherein the set of actions is selected from at least one of generating an alert, recommending an action to reduce the selected type of emission, collecting additional emissions data in the set of areas, collecting the additional emissions data in infrastructure in the set of areas, indicating a presence of a leak of the selected type of emission, or adjusting operation of equipment identified as generating the potentially undesired emission level for the selected type of emission.

8. The computer implemented method of claim 1, wherein the satellite data is selected from at least one of a satellite image, spectral data, or concentration data.

9. The computer implemented method of claim 1, wherein the selected type of emission is selected from a group comprising a greenhouse gas, methane, carbon dioxide, nitrous oxide, a fluorinated gas, a particulate matter, a volatile organic compound, nitrous oxide, sulfur dioxide, and ozone.

10. The computer implemented method of claim 1 wherein the selected type of emission comprises methane and the method further comprises:

identifying the set of areas on the planet comprises analyzing historical satellite data of the set of areas over a predetermined time period to identify temporal emission patterns;

identifying the infrastructure comprises identifying at least one of oil and gas pipelines, natural gas storage facilities, or landfill sites in the set of areas; and selecting the number of Internet of Things sensors comprises selecting sensors having methane detection sensitivity of at least 1 part per million and deploying the sensors at intervals determined based on detected wind patterns in the set of areas.

11. The computer implemented method of claim 1, wherein training the machine learning model further comprises:

creating a training dataset comprising historical satellite spectral data and historical emission data with correlated timestamps; and training the machine learning model to identify patterns correlating spectral signatures in the historical satellite spectral data with known emission levels in the historical emission data, wherein the trained machine learning model predicts potentially undesired emission levels in areas where spectral signatures match the identified patterns but emission levels are not directly observable in the current satellite data.

12. A computer system comprising:

a number of processor units, wherein the number of processor units executes program instructions to:

train a machine learning model using historical satellite spectral data correlated with known emission levels for the selected type of emission, wherein the machine learning model is configured to identify spectral signatures indicative of potentially undesired emission levels;

analyze current satellite data from a planetary region using the trained machine learning model to identify a set of areas on a planet with spectral signatures matching the potentially undesired emission level for a selected type of emission;

identify infrastructure in the set of areas from spectral signatures in the satellite data;

select a number of existing Internet of Things sensors associated with the infrastructure to monitor for the selected type of emission in the set of areas in real time, wherein the selecting comprises choosing from sensors already deployed in the infrastructure;

analyze emissions data generated by the number of Internet of Things sensors from monitoring for the selected type of emission to form an analysis; and perform a set of actions using the analysis.

13. The computer system of claim 12, wherein the number of processor units further executes program instructions to:

generate a visual display for at least one of the set of actions or the analysis in a graphical user interface on a display system and wherein the analysis comprises at least one of: a level of emissions for the selected type of emission in a number of locations in the set of areas, an identification of a set of sources for the selected type of emission in the set of areas, a spread of the selected type of emission, or a trend for the selected type of emission over time; and performing, by the number of processor units, a set of actions using the analysis.

14. The computer system of claim 12, wherein the number of processor units further executes program instructions to:

determine a spread of emissions for the selected type of emission using the emissions data generated by the Internet of Things sensors; and select new Internet of Things sensors in new locations to monitor for the selected type of emission based on the spread of the selected type of emission, wherein the new Internet of Things sensors generate new emissions data used in the analysis.

15. The computer system of claim 14, wherein in identifying the set of areas, the number of processor units further executes program instructions to:

identify the set of areas on the planet with the potentially undesired emission level for the selected type of emission using the satellite data, the machine learning model, and at least one of weather patterns, land-use patterns, or emissions levels of the selected type of emission.

16. The computer system of claim 12, wherein in identifying, by the number of processor units, the set of areas, the number of processor units further executes program instructions to:

identify a set of locations in infrastructure in the set of areas for the potentially undesired emission level for the selected type of emission using satellite data and a machine learning model trained to identify the potentially undesired emission level for the selected type of emission.

17. The computer system of claim 16, in selecting the number of Internet of Things sensors, the number of processor units further executes program instructions to:

select the number of Internet of Things sensors in the set of locations in the infrastructure to monitor for the selected type of emission.

18. The computer system of claim 12, wherein training the machine learning model further comprises:

creating a training dataset comprising historical satellite spectral data and historical emission data with correlated timestamps; and training the machine learning model to identify patterns correlating spectral signatures in the historical satellite spectral data with known emission levels in the historical emission data, wherein the trained machine learning model predicts potentially undesired emission levels in areas where spectral signatures match the identified patterns but emission levels are not directly observable in the current satellite data.

19. A computer program product for monitoring a selected type of emission, the computer program product comprising a computer readable storage medium having program instructions embodied therewith, the program instructions executable by a computer system to cause the computer system to:

train a machine learning model using historical satellite spectral data correlated with known emission levels for the selected type of emission, wherein the machine learning model is configured to identify spectral signatures indicative of potentially undesired emission levels;

analyze current satellite data from a planetary region using the trained machine learning model to identify a set of areas on a planet with spectral signatures matching the potentially undesired emission level for the selected type of emission;

identify infrastructure in the set of areas from spectral signatures in the satellite data;

select a number of existing Internet of Things sensors associated with the infrastructure to monitor for the selected type of emission in the set of areas in real time, wherein the selecting comprises choosing from sensors already deployed in the infrastructure;

analyze emissions data generated by the number of Internet of Things sensors from monitoring for the selected type of emission to form an analysis, wherein the analysis comprises at least one of: a level of emissions for the selected type of emission in a number of locations in the set of areas, an identification of a set of sources for the selected type of emission in the set of areas, a spread of the selected type of emission, or a trend for the selected type of emission over time; and performing, by the number of processor units, a set of actions using the analysis; and perform a set of actions using the analysis.

20. The computer programming product of claim 19, further comprising:

generating, by the number of processor units, a visual display for at least one of the set of actions or the analysis in a graphical user interface on a display system and wherein the analysis comprises at least one of: a level of emissions for the selected type of emission in a number of locations in the set of areas, an identification of a set of sources for the selected type of emission in the set of areas, a spread of the selected type of emission, or a trend for the selected type of emission over time.

* * * * *